United States Patent [19]

Wu et al.

[11] Patent Number: 5,355,745
[45] Date of Patent: Oct. 18, 1994

[54] BICYCLE SPEED CONTROLLER

[75] Inventors: Huann-Wen Wu, Miao Li; Tieh-Yung Hsuan, North Area Taichung, both of Taiwan

[73] Assignee: Chuan Fei Industrial Limited Company, Taichung Hsien, Taiwan

[21] Appl. No.: 928,367

[22] Filed: Aug. 12, 1992

[51] Int. Cl.$^5$ ............................................. B62M 25/04
[52] U.S. Cl. ..................... 74/502.2; 74/489; 74/540
[58] Field of Search ............ 74/502.2, 489, 523, 74/533, 534, 535, 537, 540, 541, 575, 577 S

[56] References Cited

U.S. PATENT DOCUMENTS

| | | | |
|---|---|---|---|
| 2,770,980 | 11/1956 | Millward | 74/489 |
| 2,785,586 | 3/1957 | Schwerdhofer | 74/489 |
| 3,972,247 | 8/1976 | Armstrong | 74/534 X |
| 4,343,201 | 8/1982 | Shimano | 74/489 X |
| 4,364,284 | 12/1982 | Tani et al. | 74/540 |
| 4,391,159 | 7/1983 | Sellmeyer | 74/540 X |
| 4,995,280 | 2/1991 | Tagawa | 74/502.2 X |
| 5,012,692 | 5/1991 | Nagano | 74/489 X |
| 5,054,333 | 10/1991 | Scott et al. | 74/540 X |
| 5,094,120 | 3/1992 | Tagawa | 74/502.2 X |

FOREIGN PATENT DOCUMENTS

| | | | |
|---|---|---|---|
| 361335 | 4/1990 | European Pat. Off. | 74/502.2 |
| 392457 | 10/1990 | European Pat. Off. | 74/502.2 |
| 485955 | 5/1992 | European Pat. Off. | 74/502.2 |
| 2-88385 | 3/1990 | Japan | 74/502.2 |
| 3-42394 | 2/1991 | Japan | 74/489 |

*Primary Examiner*—Rodney H. Bonck
*Assistant Examiner*—Ryan W. Massey
*Attorney, Agent, or Firm*—Bacon & Thomas

[57] ABSTRACT

A bicycle speed control having a casing to hold a control mechanism being consisted of a sector ratchet wheel, a cable winch and a lever, an upper stop plate and a curved lower stop plate for controlling shifting of speeds of a bicycle, wherein moving the curved lower stop plate with the thumb toward the lever causes the bicycle controller to shift from a lower speed to a higher speed; moving the lever with the index finger toward the curved lower stop plate causes the bicycle controller to shift from a higher speed to a lower speed.

3 Claims, 6 Drawing Sheets

BICYCLE SPEED CONTROLLER

BACKGROUND OF THE INVENTION

The present invention relates to a bicycle speeder control for controlling the speeder of a bicycle which is orthopedically engineered for easy and positive control.

A bicycle speed controller is a device for shifting the gears of a bicycle speeder so as to regulate speed. A bicycle speed controller according to the prior art, as illustrated in FIGS. 1 and 2, is generally comprised of an upper stop plate and a lever held in a casing fastened to a bicycle's handlebar by a ring for shifting the bicycle controller from a higher speed to a lower speed or from a lower speed to a higher speed respectively. Because the lever and the upper stop plate are disposed adjacent to each other and moved in the same direction for shifting the bicycle speeds reversely, false shifting controls tend to happen.

SUMMARY OF THE INVENTION

The present invention eliminates the aforesaid problem. It is therefore the main object of the present invention to provide a bicycle speed controller which is orthopedically engineered for shifting a bicycle controller with the thumb and the index finger in reverse directions. According to the preferred embodiment, the bicycle speed controller is generally comprised of a control mechanism which is consisted of a sector ratchet wheel, a cable winch and a lever, an upper stop plate and a curved lower stop plate respectively pivoted to a casing secured to a bicycle's handlebar for controlling shifting of speeds of a bicycle controller. Moving the curved lower stop plate with the thumb toward the lever causes the bicycle controller to shift from a lower speed to a higher speed; moving the lever with the index finger toward the curved lower stop plate causes the bicycle controller to shift from a higher speed to a lower speed.

BRIEF DESCRIPTION OF THE DRAWINGS

FIGS. 5-1, 5-2, 5-3 illustrate the operation of the bicycle speed controller according to the present invention.

DETAILED DESCRIPTION OF THE PREFERRED EMBODIMENT

Figure 3:
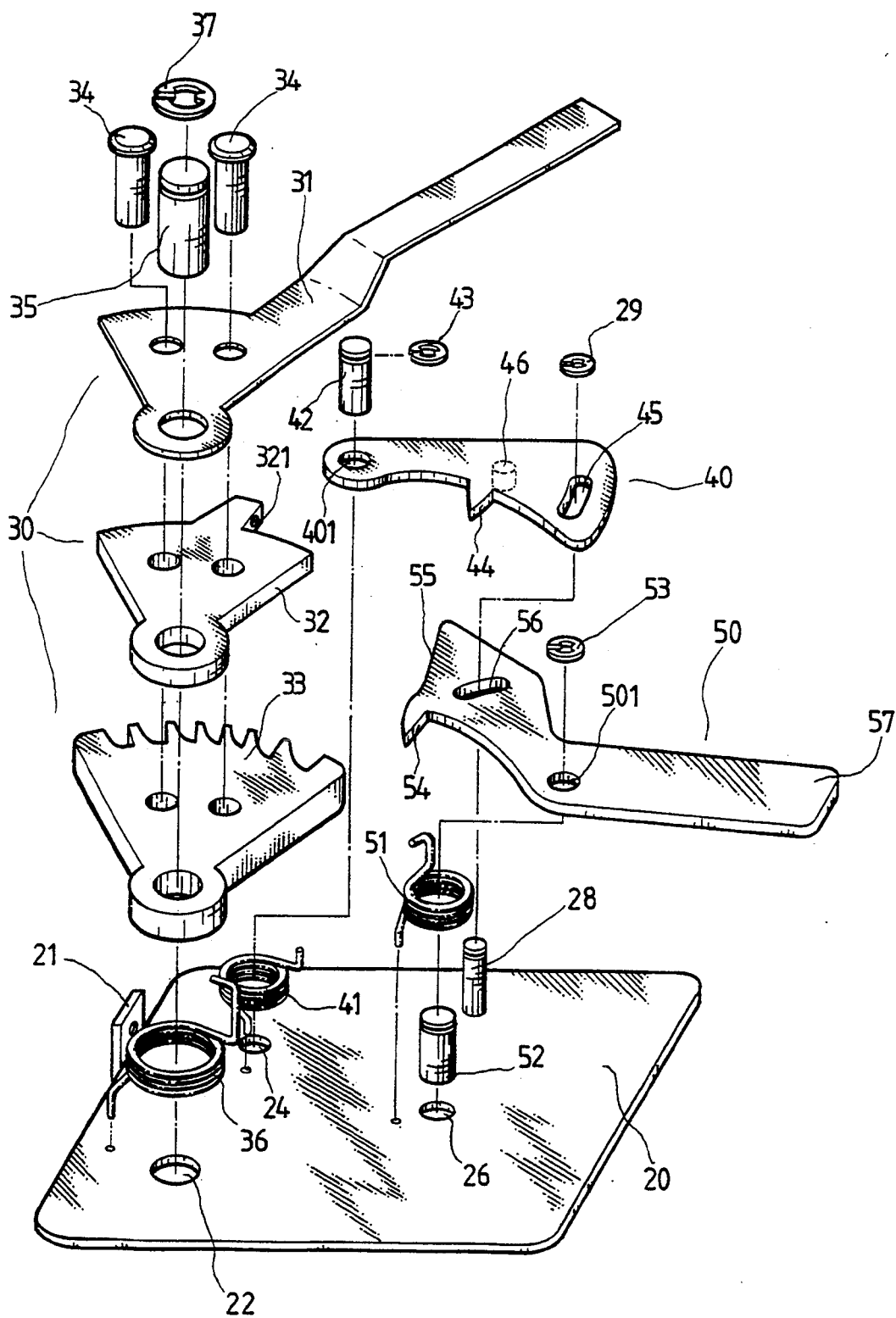
FIG. 3 is an exploded view of a bicycle speed controller embodying the present invention.
Figure 4:
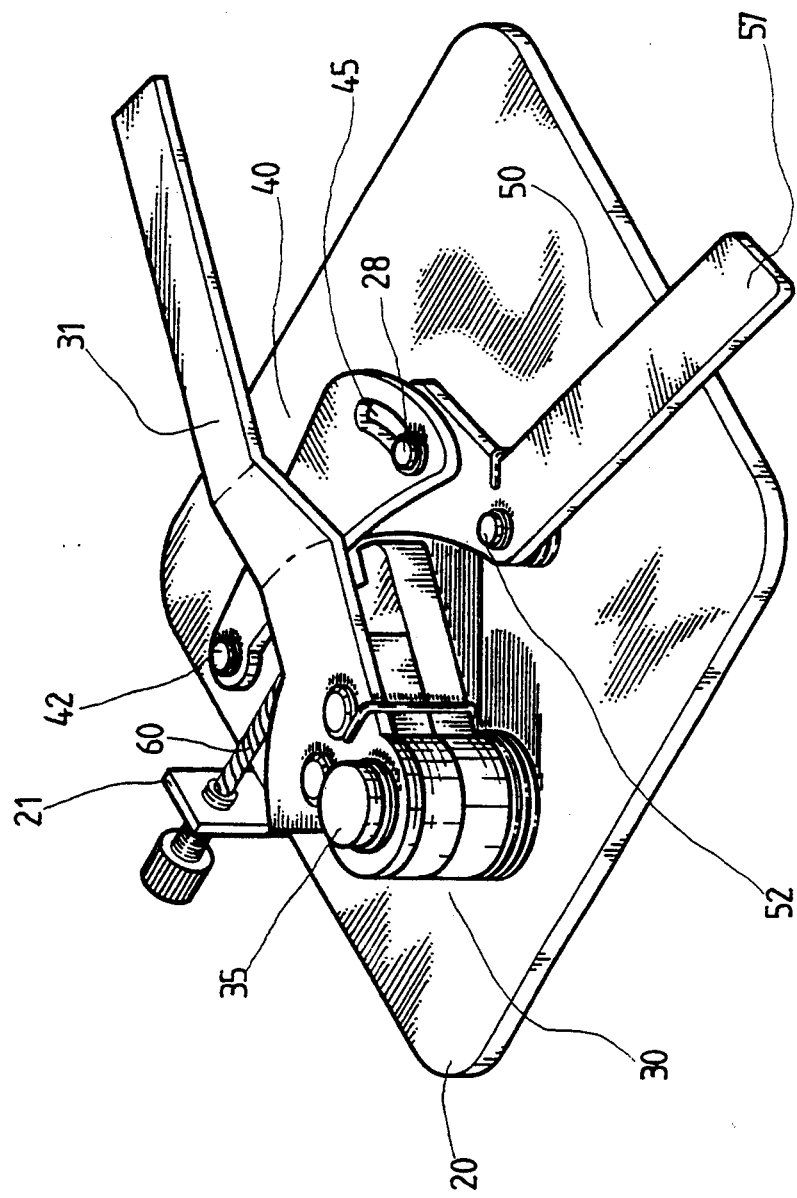
FIG. 4 is an elevational view of the bicycle speed controller of FIG. 3.

Referring to FIGS. 3 and 4, a bicycle speed controller as constructed in accordance with the present invention is generally comprised of a casing 20, a control mechanism 30, an upper stop plate 40, and a curved lower stop plate 50. The casing 20 may be made in any of a variety of shapes. In the annexed drawings, the casing 20 is presented in the form of a flat plate for easy showing of the internal members and parts. As illustrated, the casing 20 has a wire hole 21 raised from the peripheral edge thereof at one side, three through holes (namely, a first through hole 22, a second through hole 24 and a third through hole 26) and a guide post 28 spaced on the top edge thereof at suitable locations. The control mechanism 30 is consisted of a lever 31, a cable winch 32 and a sector ratchet wheel 33 connected in series by rivets 34 and pivotably fastened to the first through hole 22 on the casing 20 by a pin 35, a clamp 37 and a torsional spring 36. The upper stop plate 40 has a through hole 401 on one end pivotably secured to the second through hole 24 on the casing 20 by a pin 42, a clamp 43 and a torsional spring 41, a pawl 44 on the middle at one side, a sliding slot 45 on an opposite end, and a bottom rod 46 projected from the bottom edge thereof. The curved lower stop plate 50 has a through hole 501 on the middle pivotably secured to the third through hole 26 on the casing 20 by a pin 52, a clamp 53 and a torsional spring 51 retained between the casing 20, a pressure bar 57 on one end, a stop edge 55 and a pawl 54 on an opposite end, and a sliding slot 56 adjacent to the stop edge 55.

When assembled, as illustrated in FIG. 4, the upper stop plate 40 is disposed above the curved lower stop plate 50 and covered over a part of it; the guide post 28 of the casing 20 is inserted through the sliding slot 56 on the curved lower stop plate 50 and the sliding slot 45 on the upper stop plate 40 and clamped with a clamp 29 to hold them in place. Under normal condition, the pawl 44 of the upper stop plate 40 engages the sector ratchet wheel 33; the pawl 54 of the curved lower stop plate 50 is spaced from the sector ratchet wheel 33; the stop edge 55 of the curved lower stop plate 50 is stopped against the bottom rod 46 of the upper stop plate 40; the lever 31 and the pressure bar 57 of the curved lower stop plate 50 project out of the casing 20 in different directions.

Figure 1:
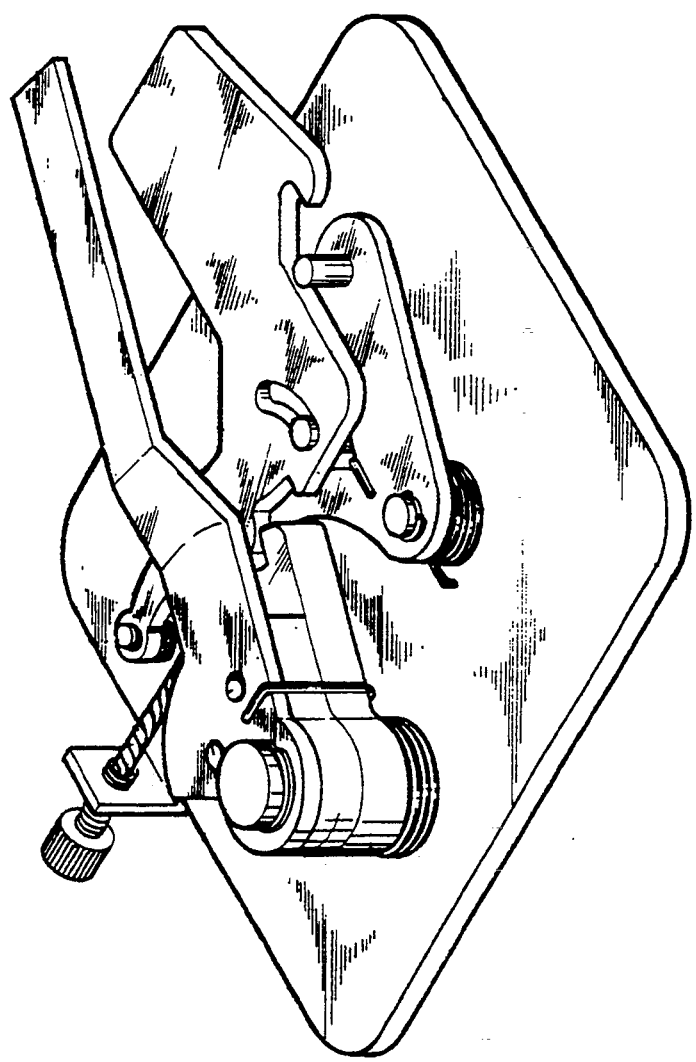
FIG. 1 is an elevational view of a bicycle speed controller.
Figure 2:
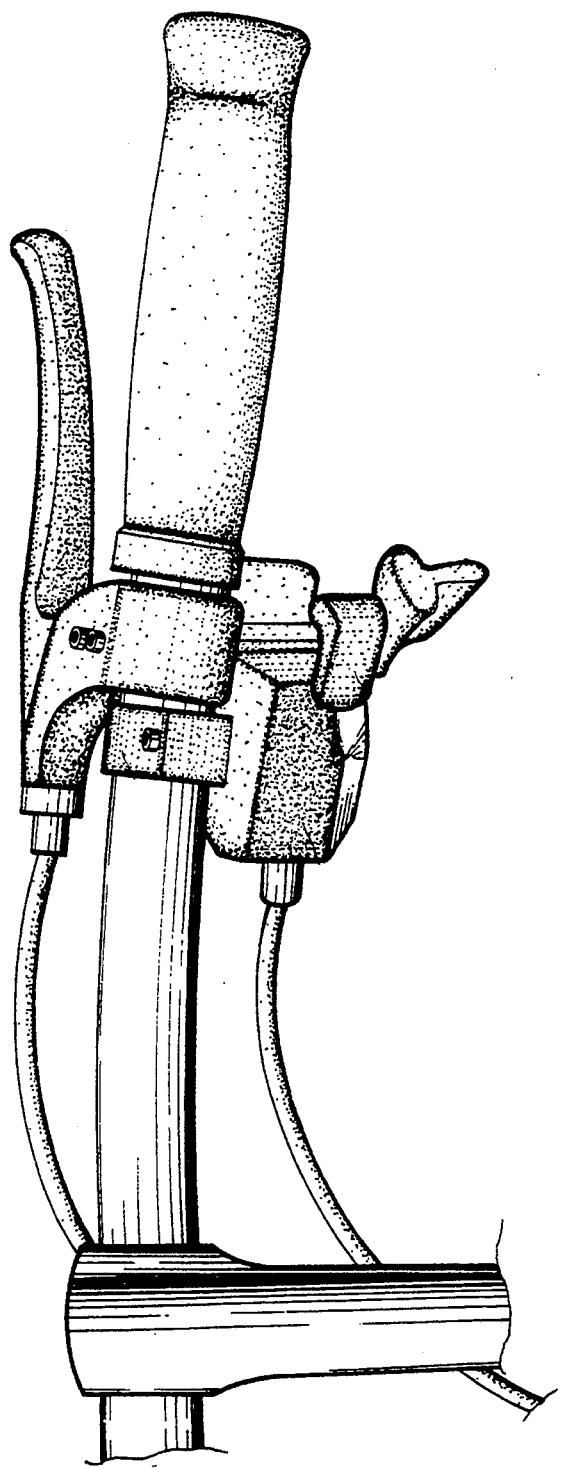
FIG. 2 is an installed view showing that the bicycle speed controller of FIG. 1 has been fastened to the bicycle's handlebar.
Figures 1, 5:
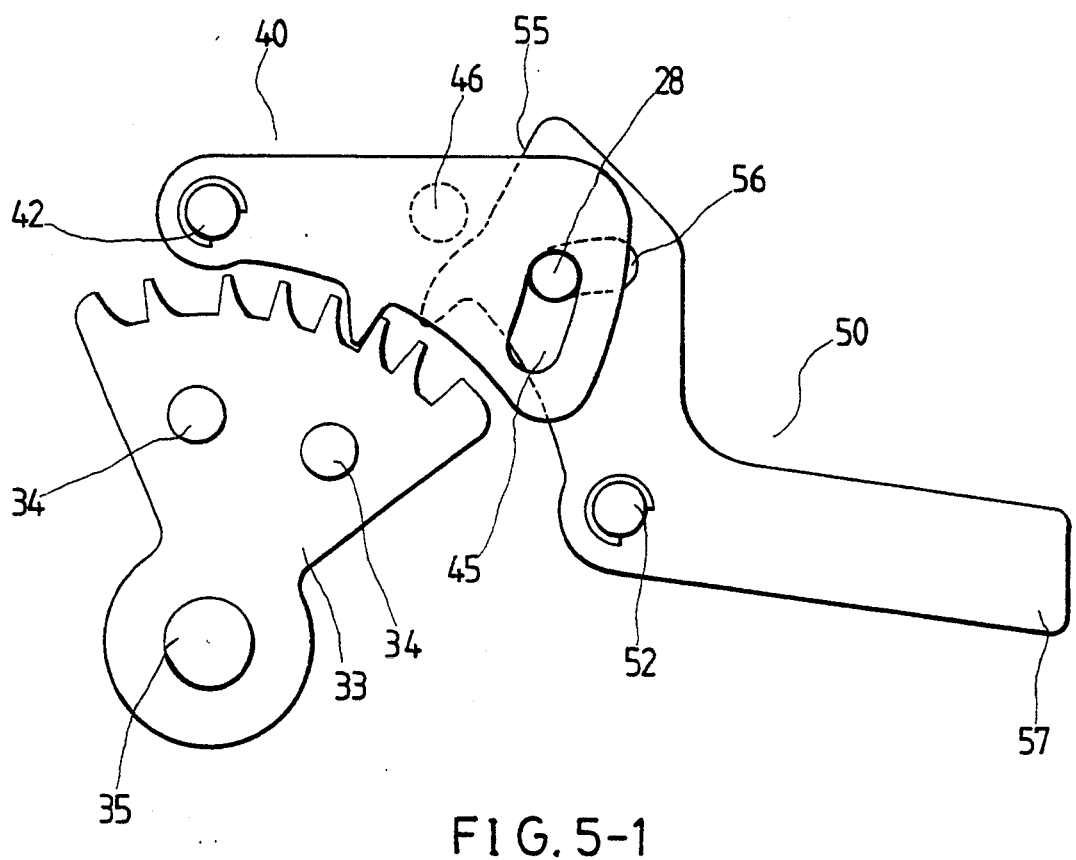
Figures 2, 5:
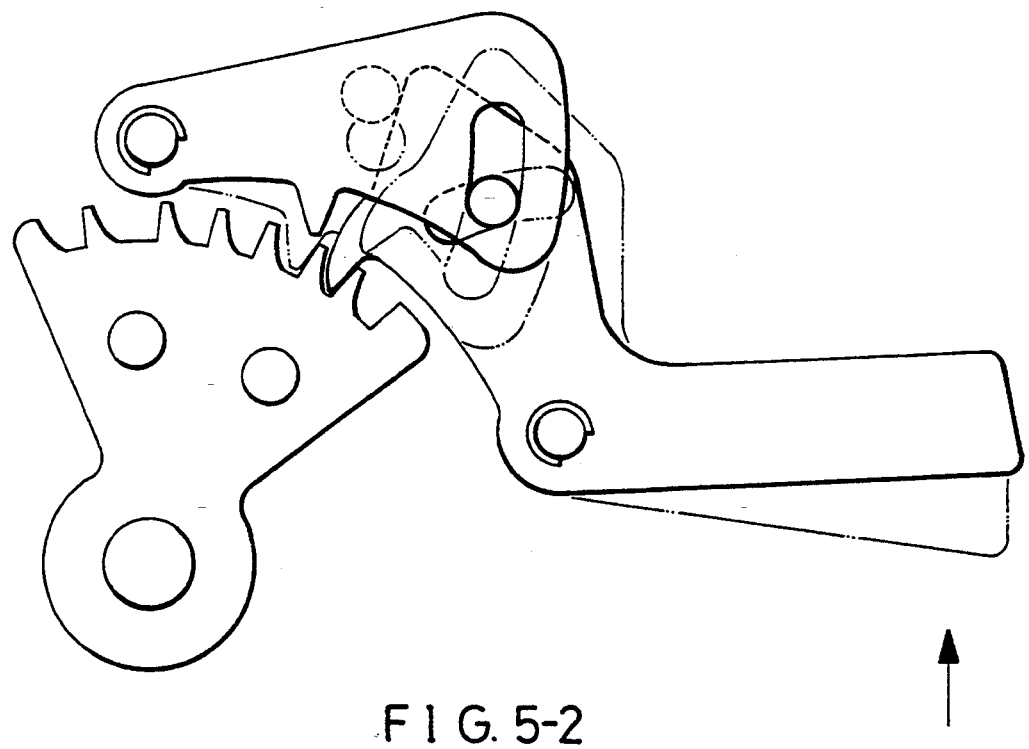
Figures 3, 5:
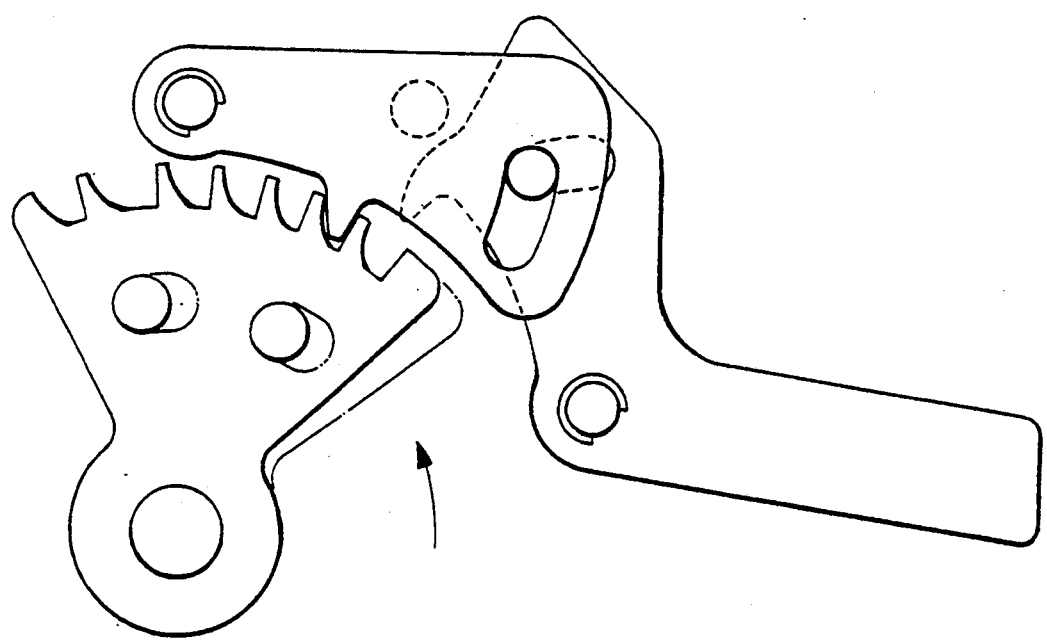

Referring to FIGS. 5-1, 5-2, 5-3, moving the pressure bar 57 of the curved lower stop plate 50 toward the lever causes the pawl 54 to displace downwards and engage the sector ratchet wheel 33, and simultaneously causes the stop edge 55 to move the bottom rod 46 in carrying the pawl 44 of the upper stop plate 40 from the sector ratchet wheel 33 (see FIGS. 5-1 and 5-2). Once the pressure bar 57 of the curved lower stop plate 50 was released, the torsional springs 41, 51 automatically move back the upper stop plate 40 and the curved lower stop plate 50 causing the pawl 44 of the upper stop plate 40 to engage the next pitch, and therefore the bicycle controller (not shown) is shifted to the next gear. Changing the bicycle controller back to the preceding speed can be simply done by rotating the lever 31 in the reverse direction.

The arrangement of the guide post 28 confines the respective stroke of the upper stop plate 40 and the curved lower stop plate 50 and ensure their stable movement. Furthermore, the cable winch 32 has a through hole 321 at a suitable location, which is alinged with the wire hole 21 on the casing 20 for fastening the steel cable 60 of the bicycle controller as the bicycle speed controller is shifted to the highest speed. When installed in the handlebar, the pressure bar 57 is disposed adjacent the index finger and the lever 31 is disposed adjacent to the thumb for positive and accurate controls respectively.

What is claimed is:

1. A bicycle speed controller comprising a control mechanism comprising a casing to hold a control mechanism, an upper stop plate and a curved lower stop plate for controlling shifting of speeds of a bicycle controller, said control mechanism being comprised of a sector ratchet wheel, a cable winch and a lever connected together and pivotably fastened to said casing, and characterized in that said upper stop plate has a through hole on one end pivoted to said casing, a pawl on one side on the middle engaging said sector ratchet wheel, a sliding slot on an opposite end in longitudinal direction hung on a guide post on said casing, and a bottom rod projected from a bottom edge thereof; said curved lower stop plate has a through hole on the middle pivotably secured to said casing, a pressure bar on one end extended out of said casing in a direction deviated from said lever, a stop edge on an opposite end stopped against the bottom rod on said upper stop plate, a pawl adjacent to the stop edge spaced from said sector ratchet wheel, and a sliding slot in latitudinal direction hung on the guide post on said casing.

2. The bicycle speeder control according to claim 1, wherein moving the pressure bar of said curved lower stop plate toward said lever causes the pawl of said curved lower stop plate to engage said sector ratchet wheel, and simultaneously causes the stop edge of said curved lower stop plate to move the bottom rod of said upper stop plate in carrying the pawl of said upper stop plate from said sector ratchet wheel, so that the pawl of said upper stop plate is moved back by a spring means to engage a next pitch in the teeth on said sector ratchet wheel causing the bicycle controller to be shifted to a next gear after the pressure bar of said curved lower stop plate was released; rotating said lever toward said curved lower stop plate causes the pawl of said upper stop plate to disengage from one pitch in the teeth on said sector ratchet wheel and engage the preceding pitch, causing the bicycle controller to be shifted to the preceding speed.

3. The bicycle speeder control according to claim 1, wherein the guide post on said casing inserts into the sliding slots on said upper stop plate and said curved lower stop plate to limit the respective moving range of said upper stop plate and said curved lower stop plate.

* * * * *